United States Patent
Yoda

(10) Patent No.: US 6,781,716 B1
(45) Date of Patent: Aug. 24, 2004

(54) COLOR CONVERSION METHOD, COLOR CONVERSION APPARATUS, AND COLOR CONVERSION DEFINITION STORAGE MEDIUM

(75) Inventor: Akira Yoda, Ashigarakami-gun (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 944 days.

(21) Appl. No.: 09/631,958

(22) Filed: Aug. 3, 2000

(30) Foreign Application Priority Data

Aug. 3, 1999 (JP) .......................................... 11-219469

(51) Int. Cl.$^7$ ............................................. G06F 15/00
(52) U.S. Cl. ..................... 358/1.9; 358/1.9; 358/518; 358/520; 382/162; 382/167
(58) Field of Search ...................... 358/1.9, 2.1, 3.02, 358/3.23, 3.26, 3.27, 500, 501, 502, 503, 505, 516, 518, 526, 525, 537; 382/162, 167; 345/589, 590, 591, 593, 601, 602, 603, 604

(56) References Cited

U.S. PATENT DOCUMENTS

| | | | |
|---|---|---|---|
| 5,583,665 A | 12/1996 | Gregory, Jr. et al. | 358/504 |
| 5,724,442 A * | 3/1998 | Ogatsu et al. | 382/167 |
| 5,748,342 A * | 5/1998 | Usami | 358/500 |
| 5,754,184 A | 5/1998 | Ring et al. | |
| 6,301,383 B1 * | 10/2001 | Ito et al. | 382/162 |
| 6,724,507 B1 * | 4/2004 | Ikegami et al. | 358/518 |

* cited by examiner

Primary Examiner—Scott Rogers
Assistant Examiner—Tia Carter
(74) Attorney, Agent, or Firm—Sughrue Mion, PLLC

(57) ABSTRACT

Input color data is converted into output color data using an input profile, a color conversion table for converting a set of values of input coordinate within L*a*b* color space into a set of values of output coordinate moved in an opposite direction to a direction of a vector wherein coordinate points of a reference white determined within a white area of the L*a*b* color space are given as a starting point, and coordinate points of a basic color, in which the set of values of input coordinate exists outside ±90° in hue angle with respect to hue of a basic color, of basic colors determined in a cyan color area, a magenta color area and a yellow color area of the L*a*b* color space, respectively, are given as a terminating point, and an output profile.

14 Claims, 10 Drawing Sheets

COLOR CONVERSION METHOD, COLOR CONVERSION APPARATUS, AND COLOR CONVERSION DEFINITION STORAGE MEDIUM

BACKGROUND OF THE INVENTION

1. Field of the Invention

The present invention relates to color conversion method and color conversion apparatus for performing a color conversion so that a suitable color quality can be obtained in the event that image data, which is obtained by an input device for receiving an image to derive image data, is outputted from an output device for outputting (including not only printing outputs, but also output styles such as a display and a printing machine) an image in accordance with the image data, and a color conversion definition storage medium storing therein a color conversion definition with which a preferred color quality can be obtained.

2. Description of the Related Art

In a system in which an original document is taken into a computer by a reversal film and a digital still camera (DSC) and then the received original document is subjected to a correction of color tone, and data for reflection print output such as print and photograph are generated, there is a need of a technical skill of a man of experience in order to obtain a preferred finishing. This technical skill includes such a matter that the skilled person knows sufficiently the association between digital data and finishing, and in addition the skilled person knows "what color tone an image is to be finished into" or "in what manner an image having a desired impressive expression can be obtained".

According to the prior art, in the make-up color separation scanner, a skilled operator obtains a desired finishing color tone upon recognition of characteristics of the scanner system and the output system (a dot recorder/a printing plate/a printing), and the association between an amount of operation of a control dial of the internal color processing system and movement of data, and in addition change of finishing color. According to the general using way of the make-up color separation scanner, at the time of introduction of the make-up color separation scanner, a person of experience of a seller side of the scanner or a person of experience of buyer side produces preset values (basic conditions) of color processing system control parameters (several tens to one hundred several tens of parameters) so that an optimum color conversion for the usage can be obtained. After the adjustment works for several weeks, several sets of preset values classified for each working content are produced. In the actual color separation work, there are produced data for printing wherein a desired finishing is obtained through applying a fine adjustment for each original document in accordance with the preset values.

Data dealt with in the make-up scanner are used, at the input side, in form of CMY density data wherein RGB values of a read sensor are converted into read density, or equivalent neutral CMY density data. The CMY density data are subjected to a gray range setting (high light, shadow balance), a gray gradation conversion, a color correction, UCR, and a K-print generation, and then density values are converted into dot % to form output data. All setting values of those are concerned with reproduced color, and thus it is impossible to optimize a single parameter. What is concerned with the largest number of parameters is the color correction. By way of typical example, false lightness signal, saturation signal and hue signal are extracted from CMY signals, and there are defined functions of determining correction factors associated with CMYK in accordance with the respective signal intensities. The color correction is divided into a main color correction and a selective color correction in accordance with an effective hue range. The main color correction covers a hue range of 180 degrees on each of necessary colors CMY in such a meaning that CMY three primary colors for forming color are necessary or not, that is, brightness and muddiness of color are independently controlled, and covers a hue range of 180 degrees on each of RGB as unnecessary colors. With respect to the selective color correction, there are prepared functions on 6 hues so as to be effective for a hue range of 120 degrees in such a meaning that the same family colors are controlled. The lightness signal, the hue signal and the saturation signal are formed from the CMY signals entered to the color correction section. Accordingly, an alteration of the gradation conversion at the pre-stage of the color correction section involves a change of color correction characteristics. Further, a quantity of correction is effected mutually between the main color correction and the selective color correction, and also among hue channels in the main color correction, and thus work of producing the condition sets needs skill. However, providing the optimum adjustment for those make it possible that a color range capable of being expressed with a print color material is effectively used, stereoscopic effect and depth effect are enhanced, brightness and clearness are expressed, whereby a preferred color reproduction in suitable brightness and memory color are available. This is a reason why this work is addressed as an "image formation".

On the other hand, in a system comprising a personal computer, and input and output terminals, it is possible to provide an arbitrary combination of an input device and an output device. However, colors expressed by control color signals (RGB, CMYK) depend on devices. On the other hand, U.S. Pat. No. 4,500,919 discloses a system in which color correction is carried out on a conversion basis in a state that it is displayed on a CRT display, while an image representation of interest is produced, and the image representation of interest is converted into an output signal in such a manner that a signal of the image representation of interest is identical to an "appearance". Further, there is proposed a method of obtaining the same color reproduction with any input and output devices by means of expression (a device profile) with a common color space (CCS) in which input and output display device signals are associated with human visual sensation characteristics (expressed by CIEXYZ and CIEL*a*b*). Thus, this conversion can be supported in an OS level of a personal computer, and it becomes established in form of a color management system. Here, device data is converted into color representation in the common color space (CCS) in accordance with the associated reproduced color, and there is performed a conversion from the color representation in the common color space (CCS) to another device data. With respect to both the conversions, as a scheme of mapping to a color range (gamut) in which the device can be reproduced, there are available various techniques, such as mapping considering that the color tone reproduction is important, and mapping maintaining saturation, as well as mapping exactly representing colors. The common color space is associated with the CIE color system, and thus the coincidence of colors between the different devices is basically supported. Further, the common color space makes it easy to perform an adjustment associated with the human visual sensation such as an enhancement of lightness and an enhancement of saturation.

Further there are proposed a method of absorbing a reproducing characteristic difference due to an observation environment to improve a coincidence of appearance (U.S. Pat. No. 5,754,184), and a method of preserving a result of correction in which an image is corrected on an aesthetic basis in the common color space, in form of a three-dimensional table, and it is applied to another subject (U.S. Pat. No. 5,583,665). According to those methods, colors are controlled on a conversation basis on a monitor to obtain a print color in the expected direction when a desired image is obtained. However, it is difficult to implement the preferred color reproduction in suitable brightness and memory color in accordance with those methods as mentioned above in such a manner that a color range capable of being expressed with a color material obtained by a make-up scanner is effectively used, stereoscopic effect and depth effect are enhanced, brightness and clearness are expressed. What makes it difficult to implement such a preferred color reproduction is mainly such a matter that it is difficult for parameters of LCH to provide a fine control from minimum to maximum of a quantity of color materials necessary for obtaining a preferred print finishing. Further, the fact that the saturation range reproducible in a print is not isotropic with respect to the hue and the lightness is also a main cause of the matter that processing of LCH and RGB is not suitable. For example, it is necessary for processing of enhancing saturation to use both the hue alteration and the lightness alteration together. For this reason, the LCH processing needs a three-dimensional simultaneous operation. However, this is extremely difficult. Further, according to the processing system in the common color space, after the processing, a gamut conversion to the real device data is carried out. At that time, the compression processing is performed at an area particularly near the color area boundary. An adjustment at this area is effective particularly for reproductions of saturation and gradation, but in the even that a color reproducing area compression processing is carried out after the color adjustment on LCH, a result of the adjustment is not exactly reflected on a printed color.

As mentioned above, according to the conventional color conversion system, it is difficult to cope with both the applicability to the combination of various devices and the finishing quality.

SUMMARY OF THE INVENTION

In view of the foregoing, it is an object of the present invention to provide color conversion method and color conversion apparatus for performing a color conversion capable of obtaining a color output image excellent in color quality even in the combination of various types of input and output devices, and a color conversion definition storage medium storing therein a color conversion definition capable of being suitably used for obtaining a color output image excellent in color quality even in the combination of various types of input and output devices.

To achieve the above-mentioned object, the present invention provides a color conversion method comprising:

a data receiving step of receiving input color data defined by coordinate values within an input device color space depending on an input device for receiving an image to derive image data; and a data conversion step of converting the input color data received in said data receiving step into output color data defined by coordinate values within an output device color space depending on an output device for outputting an image based on image data, using a first color conversion definition defining an association between coordinate values within the input device color space and coordinate values of a common color space independent of the input device and the output device, a second color conversion definition converting a set of values of input coordinate within partial space of at least part of the common color space into a set of values of output coordinate moved in an opposite direction to a direction of a vector wherein coordinate points of a reference white determined within a white area of the common color space are given as a starting point, and coordinate points of a basic color, in which the set of values of input coordinate exists outside ±90° in hue angle with respect to hue of a basic color, of basic colors determined in a cyan color area, a magenta color area and a yellow color area of the common color space, respectively, are given as a terminating point, and a third color conversion definition defining an association between coordinate values within the common color space and coordinate values of the output device color space.

Adoption of the second color conversion definition causes that hue is not always preserved, so that it happens that an input color is converted into an output color which is different in hue from the input color. However, preserving faithfully hue does not always implies improvement of color quality. According to the color conversion method of the present invention, it is possible to obtain output color data for providing a color output image which is higher in color quality as compared with a case where hue is faithfully preserved.

Further, according to the present invention, the second color conversion definition performs a color conversion on the common color space. This feature makes it possible to apply the color conversion to various types of input device and output device.

In the color conversion method according to the present invention as mentioned above, it is preferable that in a case where the common color space is L*a*b* color space, or a case where the common color space is converted into L*a*b* color space, coordinate points $(L_c, a_c, b_c)$, $(L_m, a_m, b_m)$ $(L_y, a_y, b_y)$ of a cyan basic color determined in the cyan area, a magenta basic color determined in the magenta area and a yellow basic color determined in the yellow area, of said basic colors, satisfy $$40<L_c<65, -25<a_c<-55, -35<b_c<-60$$

$$30<L_m<60, 40<a_m<90, -20<b_m<20$$

$$70<L_y<90, -20<a_y<20, 50<b_y<130$$

and coordinate points $(L_w, a_w, b_w)$ of said reference white satisfy $$80<L_w\leq100, |a_w|<10, |b_w|<10.$$

Determination of coordinate points for the respective basic colors and coordinate points for the basic white in the respective color areas makes it possible to greatly improve a color quality as compared with a case where the second color conversion is not adopted.

In the color conversion method according to the present invention as mentioned above, it is acceptable that said second color conversion definition converts a set of values of input coordinate within partial space of at least part of the common color space into a set of values of output coordinate standing still in a direction of a vector wherein coordinate points of the reference white are given as a starting point, and coordinate points of a basic color, in which the set of values of input coordinate exists inside ±90° in hue angle with respect to hue of a basic color, of said basic colors, are given as a terminating point. Or alternatively it is acceptable that said second color conversion definition converts a set of values of input coordinate within partial space of at least part of the common color space into a set of values of output coordinate moved in a direction identical to a direction of a vector wherein coordinate points of the reference white are given as a starting point, and coordinate points of a basic color, in which the set of values of input coordinate exists inside ±90° in hue angle with respect to hue of a basic color, of said basic colors, are given as a terminating point.

In the event that a set of values of input coordinate exists inside ±90° in hue angle with respect to hue of a basic color, it is acceptable that no correction is made, or correction is actively made, whichever is appropriate. In any case, it is possible to obtain output data capable of producing a color output image of high color quality.

In the color conversion method according to the present invention as mentioned above, it is preferable that said data conversion step produces a single color conversion definition in which the first color conversion definition, the second color conversion definition and the third color conversion definition are combined, and converts the input color data into the output color data in accordance with the single color conversion definition.

This feature makes it possible to establish high speed conversion.

In the color conversion method according to the present invention as mentioned above, it is preferable that said data conversion step performs a color conversion using a color conversion definition adjusting a range of brightness of an image in a common color space as well as the above-mentioned first to third color conversion definitions.

To achieve the above-mentioned object, the present invention provides a color conversion apparatus comprising:

a data receiving section for receiving input color data defined by coordinate values within an input device color space depending on an input device for receiving an image to derive image data;

a data conversion section for converting the input color data received by said data receiving section into output color data defined by coordinate values within an output device color space depending on an output device for outputting an image based on image data; and a data output section for outputting output color data after conversion by said data conversion section, wherein said data conversion section converts the input color data into the output color data using a first color conversion definition defining an association between coordinate values within the input device color space and coordinate values of a common color space independent of the input device and the output device, a second color conversion definition converting a set of values of input coordinate within partial space of at least part of the common color space into a set of values of output coordinate moved in an opposite direction to a direction of a vector wherein coordinate points of a reference white determined within a white area of the common color space are given as a starting point, and coordinate points of a basic color, in which the set of values of input coordinate exists outside ±90° in hue angle with respect to hue of a basic color, of basic colors determined in a cyan color area, a magenta color area and a yellow color area of the common color space, respectively, are given as a terminating point, and a third color conversion definition defining an association between coordinate values within the common color space and coordinate values of the output device color space.

Adoption of the second color conversion definition causes that hue is not always preserved, so that it happens that an input color is converted into an output color which is different in hue from the input color. However, preserving faithfully hue does not always implies improvement of color quality. According to the color conversion method of the present invention, it is possible to obtain output color data for providing a color output image which is higher in color quality as compared with a case where hue is faithfully preserved.

Further, according to the present invention, the second color conversion definition performs a color conversion on the common color space. This feature makes it possible to apply the color conversion to various types of input device and output device.

In the color conversion apparatus according to the present invention as mentioned above, it is preferable that in a case where the common color space is L*a*b* color space, or a case where the common color space is converted into L*a*b* color space, coordinate points $(L_c, a_c, b_c)$, $(L_m, a_m, b_m)$ $(L_y, a_y, b_y)$ of a cyan basic color determined in the cyan area, a magenta basic color determined in the magenta area and a yellow basic color determined in the yellow area, of said basic colors, satisfy $$40 < L_c < 65, -25 < a_c < -55, -35 < b_c < -60$$

$$30 < L_m < 60, 40 < a_m < 90, -20 < b_m < 20$$

$$70 < L_y < 90, -20 < a_y < 20, 50 < b_y < 130$$

and coordinate points $(L_w, a_w, b_w)$ of said reference white satisfy $$80 < L_w \leq 100, |a_w| < 10, |b_w| < 10.$$

Determination of coordinate points for the respective basic colors and coordinate points for the basic white in the respective color areas makes it possible to greatly improve a color quality as compared with a case where the second color conversion is not adopted.

In the color conversion apparatus according to the present invention as mentioned above, it is acceptable that said data conversion section uses, as said second color conversion definition, a color conversion definition which converts a set of values of input coordinate within partial space of at least part of the common color space into a set of values of output coordinate standing still in a direction of a vector wherein coordinate points of the reference white are given as a starting point, and coordinate points of a basic color, in which the set of values of input coordinate exists inside ±90° in hue angle with respect to hue of a basic color, of said basic colors, are given as a terminating point. Or alternatively it is acceptable that said data conversion section uses, as said second color conversion definition, a color conversion definition which converts a set of values of input coordinate within partial space of at least part of the common color space into a set of values of output coordinate moved in a direction identical to a direction of a vector wherein coordinate points of the reference white are given as a starting point, and coordinate points of a basic color, in which the set of values of input coordinate exists inside ±90° in hue angle with respect to hue of a basic color, of said basic colors, are given as a terminating point.

In the event that a set of values of input coordinate exists inside ±90° in hue angle with respect to hue of a basic color, it is acceptable that no correction is made, or correction is actively made, whichever is appropriate. In any case, it is possible to obtain output data capable of producing a color output image of high color quality.

In the color conversion apparatus according to the present invention as mentioned above, it is preferable that said data conversion section produces a single color conversion definition in which the first color conversion definition, the second color conversion definition and the third color conversion definition are combined, and converts the input color data into the output color data in accordance with the single color conversion definition.

This feature makes it possible to establish high speed conversion

In the color conversion apparatus according to the present invention as mentioned above, it is preferable that said color conversion apparatus further comprises a definition storage section for storing:

one or more sorts of said first color conversion definition associated with one or more sorts of input device;

a plurality of sorts of said second color conversion definition;

one or more sorts of said third color conversion definition associated with one or more sorts of output device; and definition designation information designating one second color conversion definition from among the plurality of sorts of said second color conversion definition in association with said input device and/or said output device.

In this case, it is preferable that said color conversion apparatus further comprises a designating section for designating input device and output device, and said data conversion section converts the input color data into the output color data using the first, second and third color conversion definitions selected in accordance with the input device and the output device designated by said designating section, and the definition designation information associated with the input device and/or the output device designated by said designating section, from among the first, second and third color conversion definitions stored in said definition storage section.

With respect to the first, second and third color conversion definitions, particularly, the second color conversion definition, a plurality of sorts of color conversion definition are stored beforehand, and in addition definition designation information associated with the input device and/or the output device is stored. This feature makes it possible to designate the second color conversion definition as a default when the input device and the output device are designated. In other words, designation of the input device (the first color conversion definition) and the output device (the second color conversion definition) designates the second color conversion. This feature makes it possible to avoid troublesomeness for designating the second color conversion definition in addition to designation of the input device and the output device.

In the color conversion apparatus according to the present invention as mentioned above, it is preferable that said data conversion section performs a color conversion using a color conversion definition adjusting a range of brightness of an image in a common color space as well as the above-mentioned first to third color conversion definitions.

To achieve the above-mentioned object, the present invention provides a color conversion definition storage medium for storing a color conversion definition for converting a set of values of input coordinate within partial space of at least part of a common color space independent of an input device for receiving an image to derive image data and an output device for outputting an image based on image data into a set of values of output coordinate moved in an opposite direction to a direction of a vector wherein coordinate points of a reference white determined within a white area of the common color space are given as a starting point, and coordinate points of a basic color, in which the set of values of input coordinate exists outside ±90° in hue angle with respect to hue of a basic color, of basic colors determined in a cyan color area, a magenta color area and a yellow color area of the common color space, respectively, are given as a terminating point.

Conversion of color data using color conversion definition (the second color conversion definition referred to in the color conversion apparatus of the present invention) stored in the color conversion definition storage medium according to the present invention as mentioned above makes it possible to obtain a color output image excellent in color quality. Further, this conversion definition is to perform the color conversion on the common color space, and thus it is suitable for various types of input and output devices.

In the color conversion definition storage medium according to the present invention as mentioned above, it is acceptable that said color conversion definition storage medium stores in addition to said color conversion definition (the second color conversion definition referred to in the color conversion apparatus of the present invention), a color conversion definition (the first color conversion definition referred to in the color conversion apparatus of the present invention) for converting coordinate values within an input device color space depending on an input device for receiving an image to derive image data into coordinate values within the common color space, and a color conversion definition (the third color conversion definition referred to in the color conversion apparatus of the present invention) for converting coordinate values within the common color space into coordinate values within an output device color space depending on an output device for outputting an image based on image data.

DETAILED DESCRIPTION OF PREFERRED EMBODIMENTS

Embodiments of the present invention will be described with reference to the accompanying drawings.

Figure 1:
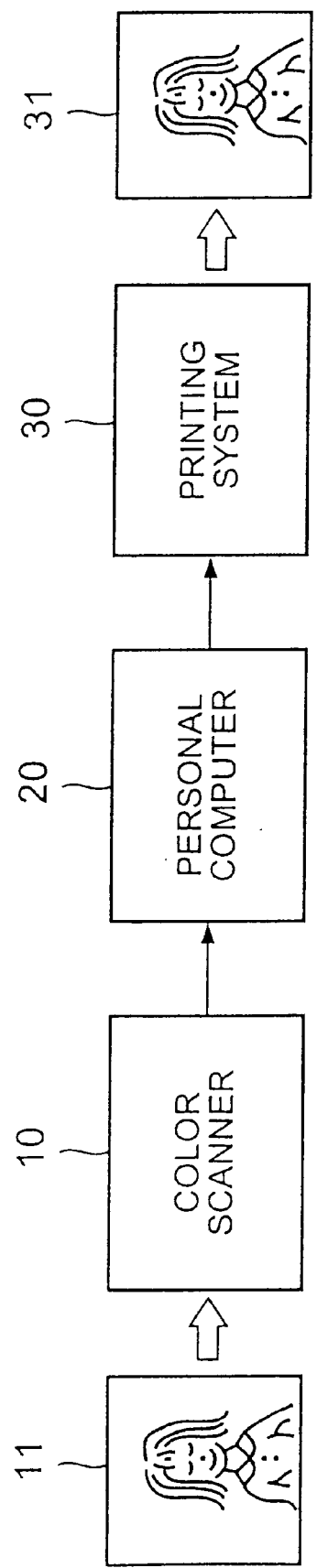
FIG. 1 is a structural view of an image input-color conversion-image output system to which an embodiment of the present invention is applied.

FIG. 1 is a structural view of an image input-color conversion-image output system to which an embodiment of the present invention is applied.

A scanner 10 reads an original image 11 to generate image data for RGB three colors. The image data for RGB are applied to a personal computer 20. The personal computer 20 converts the image data obtained in the scanner 10 into image data for CMYK four colors for image output suitable for a printing system 30 which will be described later. The image data for image output are further converted into dot data representative of dot percentage of the image and then fed to the printing system 30. The printing system 30 produces film negatives for printing associated with CMYK prints in accordance with the dot data and produces printing plates from the film negatives for printing. The printing plates thus produced are loaded onto a printing machine so that the printing machine performs a printing by process ink for CMYK four colors to form a dot image 31.

In the system shown in FIG. 1, by way of example of the input device for receiving an image to derive image data, there is used the color scanner for reading an original image to generate image data. However, any one is acceptable, as the input device, which receives an image to derive image data, for example, a digital still camera (DSC), and a system in which an image is recorded on a reversal film through the photograph using the reversal film, and the recorded image is read by a color scanner and the like to derive image data, as well as the color scanner.

Further, in the system shown in FIG. 1, by way of example of the output device for outputting an image based on image data, there is used the printing system 30 including a printing machine. However, any one is acceptable, as the output device, which outputs (hard output or display) a color image, for example, a color printer for printing and outputting a color image, a color display apparatus in which a color image is displayed.

Here, there will be described the embodiments of the present invention on the assumption that the system is provided with the color scanner 10 and the printing system 30 by way of examples of the input device and the output device, respectively.

An important feature of the system shown in FIG. 1 according to the embodiment of the present invention resides in the point of processing contents to be executed inside the personal computer 20. Hereinafter, there will be described the personal computer 20.

Figure 2:
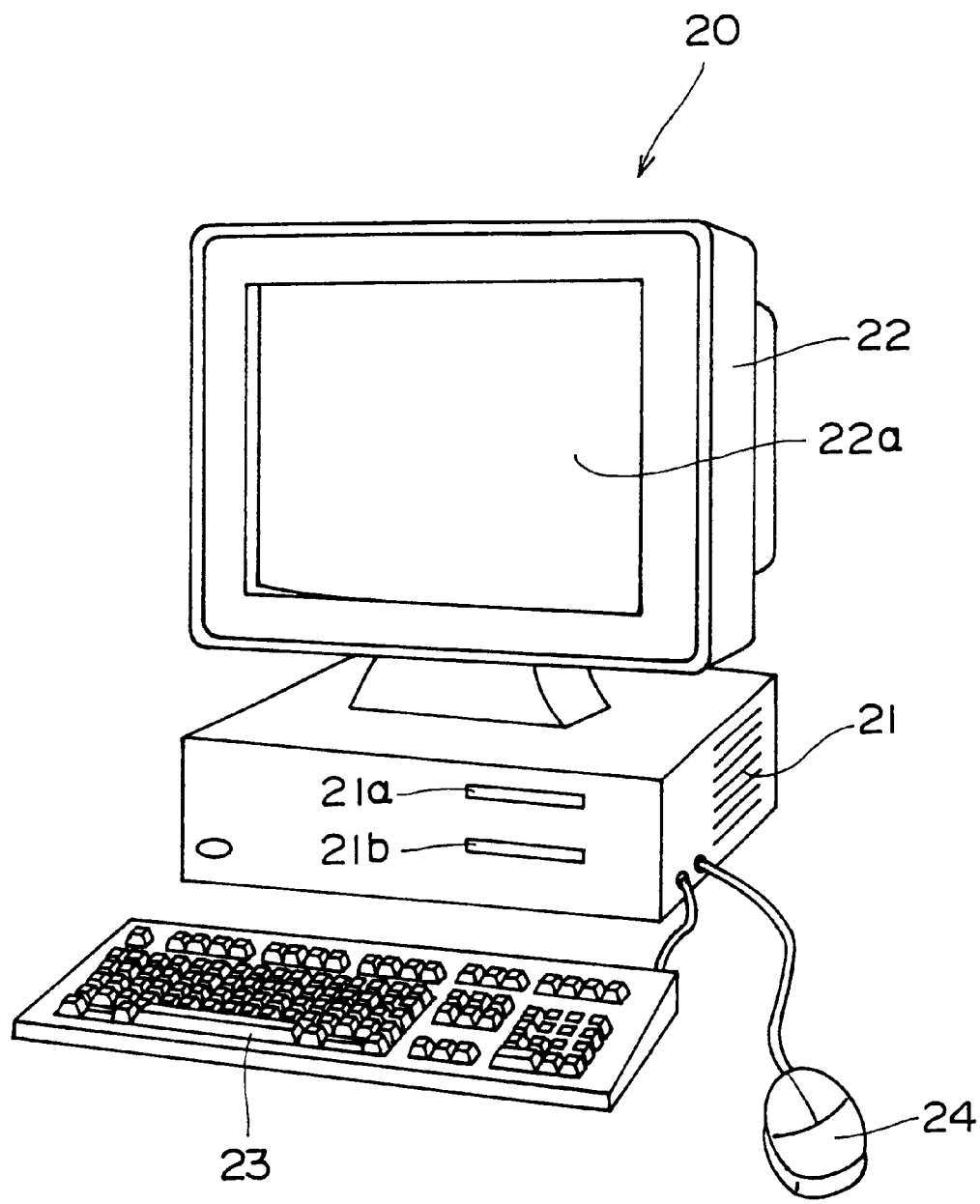
FIG. 2 is a perspective view of a personal computer shown in FIG. 1.
Figure 3:
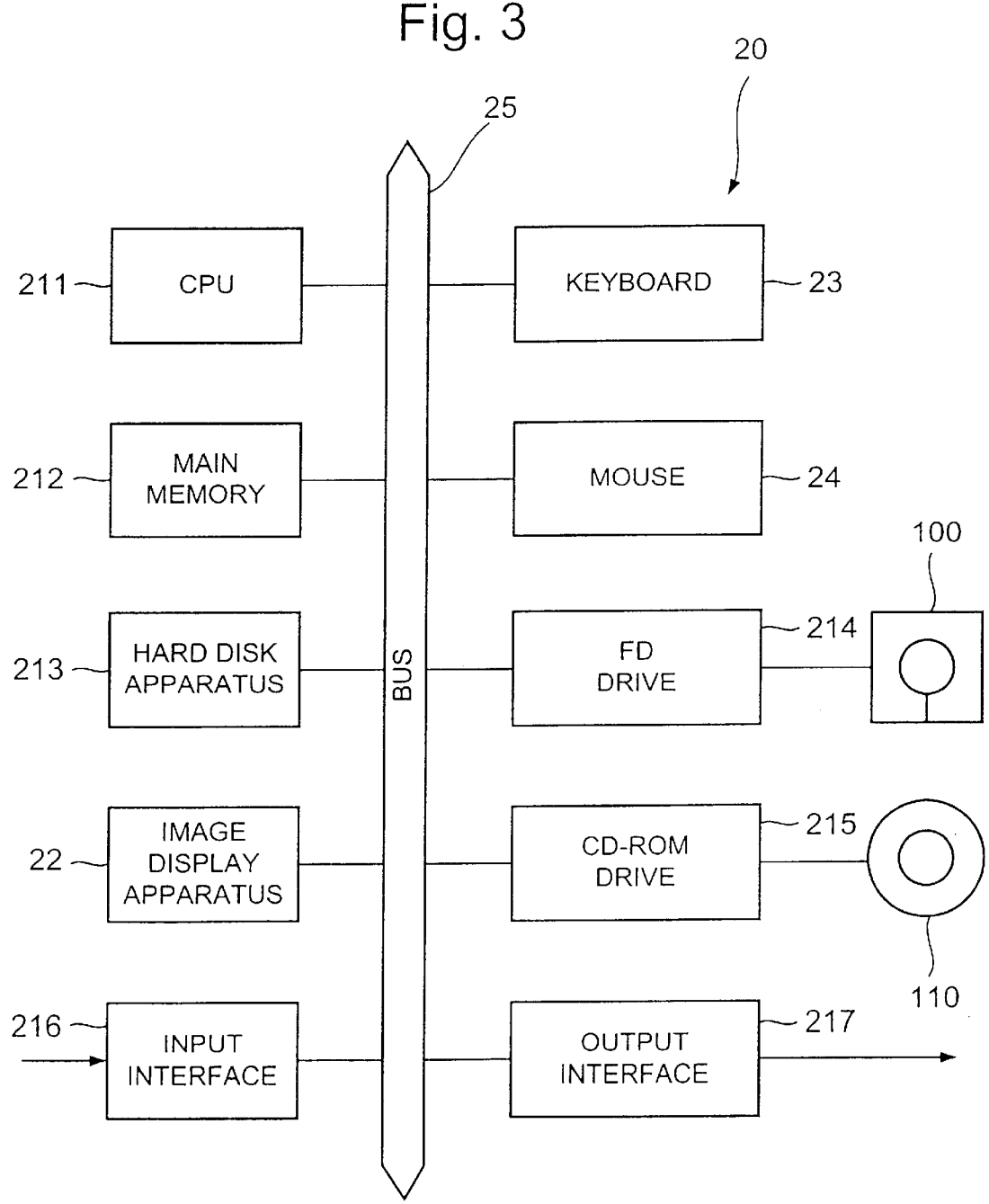
FIG. 3 is a structural view of the personal computer.

FIG. 2 is a perspective view of the personal computer 20 shown in FIG. 1. FIG. 3 is a structural view of the personal computer 20.

In FIG. 2, the personal computer 20 comprises a main frame 21, an image display unit 22 for displaying an image on a display screen 22a in accordance with an instruction from the main frame 21, a keyboard 23 for entering to the main frame 21 various sorts of information according to the key operation, and a mouse 24 for designating an optional position on the display screen 22a to enter an instruction according to, for example, an icon and the like, which is displayed on the designated position. The main frame 21 is provided with a floppy disk loading slot 21a for loading a floppy disk, and a CD-ROM loading slot 21b for loading a CD-ROM.

Inside the main frame 21, as shown in FIG. 3, there are built a CPU 211 for executing various sorts of programs, a main memory 212 in which programs stored in a hard disk unit 213 are read out and developed for execution in the CPU 211, the hard disk unit 213 for preserving various sorts of programs and data, an FD drive 214 for accessing a floppy disk 100 loaded thereonto, a CD-ROM drive 215 for accessing a CD-ROM 110 loaded thereonto, an input interface 216 connected with the color scanner 10 (cf. FIG. 1) for receiving image data from the color scanner 10, and an output interface 217 for outputting image data to the printing system 30. Those various types of elements are mutually connected via a bus 25 to the image display unit 22, the keyboard 23 and the mouse 24 which are also shown in FIG. 2.

The CD-ROM 110 stores color conversion programs and color conversion definitions which cause the personal computer 20 to operate as a color conversion apparatus. The CD-ROM 110 is loaded onto the CD-ROM drive 215 so that the color conversion programs and color conversion definitions stored in the CD-ROM 110 are up-loaded onto the personal computer 20 and thereby being stored in the hard disk unit 213.

Next, there will be described a method of producing a color conversion definition which is stored in the personal computer 20.

Figure 4:
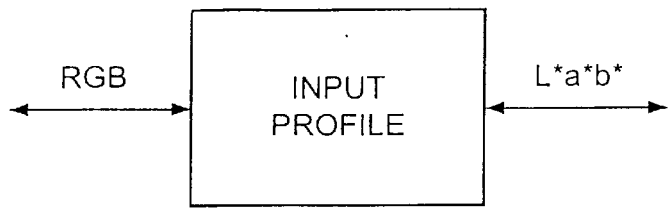
FIG. 4 is a conceptual view of an input profile as one embodiment of a color conversion definition.

FIG. 4 is a conceptual view of an input profile as one embodiment of a color conversion definition.

When an input profile is available from a maker or the like of the color scanner 10, it is unnecessary to produce newly an input profile. Here, there will be explained a basic producing method of the input profile.

As the original image shown in FIG. 1, a color patch image, which consists of a large number of color patches, are prepared. The color patch image is read by the color scanner 10 to derive color data on RGB space (an example of the input device color space referred to in the present invention) for each color patch, and the associated original image is measured by a calorimeter to derive color data representative of coordinate points on L*a*b* color space, for instance, which is an example of a common color space, for each color patch. Details of the common color space will be described later.

In this manner, there is derived an input profile defined in the association between the coordinate points on the RGB color space and the coordinate points on L*a*b* color space. The input profile thus derived is varied in accordance with a type of the color scanner 10, more generally, a sort of an input device, that is, depends on the input device.

Figure 5:
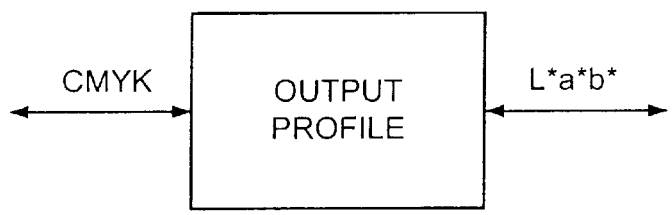
FIG. 5 is a conceptual view of an output profile as an alternative embodiment of a color conversion definition.

FIG. 5 is a conceptual view of an output profile as an alternative embodiment of a color conversion definition.

In many cases, an output profile (printing profile), which is associated with the typical printing condition, is provided from printing traders. In the event that an out put profile associated with a desired printing condition is available, it is unnecessary to produce an output profile. Here, there will be explained a basic producing method of the output profile.

From the personal computer 20 shown in FIG. 1, as dot data for CMYK four colors, there are generated dot data involved in the sequential change of dot % in units of 0%, 10%, . . . , 100%, for instance, and a color patch image based on the dot data thus generated is produced in accordance with the above-mentioned printing procedure. The image 31 shown in FIG. 1 is not concerned with a color patch image. It is regarded, however, that the color patch image is printed instead of the image 31, and the respective color patches, which constitute the color patch image, are measured by a calorimeter. Thus, there is constructed an output profile representative of the association between coordinate values on color space (an example of the output device color space referred to in the present invention) for CMYK four colors and coordinate value on the common color space (L*a*b* color space).

The output profile thus generated is varied in accordance with a type of a printing machine constituting the printing system 30, and a sort of ink. Further, the output profile is varied in accordance with an output device not restricted to the printing device, but including various types of output device. That is, the output profile depends on the output device.

Figure 6:
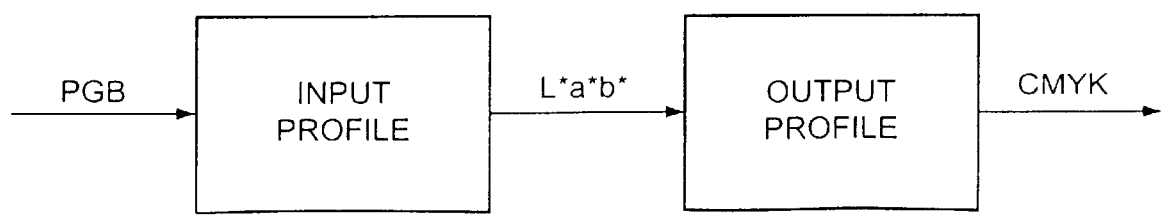
FIG. 6 is a conceptual view of a further alternative embodiment of a color conversion definition comprising both an input profile and an output profile.

FIG. 6 is a conceptual view of a further alternative embodiment of a color conversion definition comprising both an input profile and an output profile.

The input profile and the output profile, which are explained in conjunction with FIGS. 4 and 5, are stored in the personal computer 20 shown in FIG. 1 beforehand. As shown in FIG. 6, image data on RGB derived from the color scanner 10 are once converted into image data on L*a*b* color space by the input profile. The image data on L*a*b* color space are converted into image data on CMYK by the output profile, and further converted into dot data to transfer the same to the printing system 30 shown in FIG. 1. In this manner, it is possible for the printing system 30 to obtain the printed image 31 wherein a color representation of the original image 11 is faithfully reproduced as much as possible. However, in this case, even if the color representation of the original image is faithfully reproduced as much as possible, it is not implied that a printed image is excellent in color quality, and there is a possibility that a poor saturation brings about a poor image. Hereinafter, there will be described a color conversion method capable of improving the above-mentioned problems and also further improving color quality.

Figure 7:
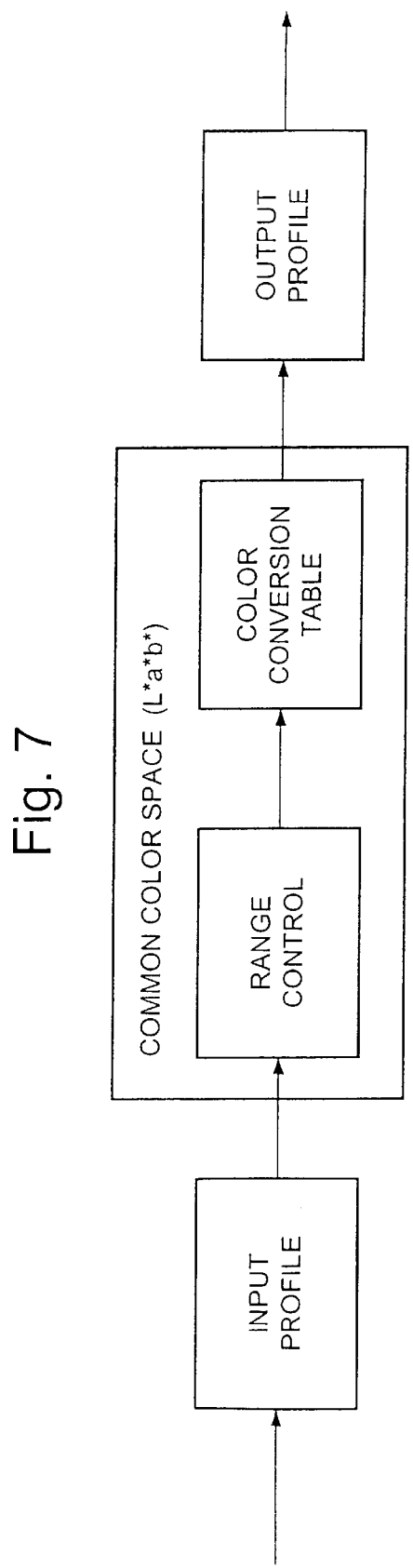
FIG. 7 is a conceptual view useful for understanding a color conversion processing to be executed inside the personal computer shown in FIGS. 1 to 3.

FIG. 7 is a conceptual view useful for understanding a color conversion processing to be executed inside the personal computer 20 shown in FIGS. 1 to 3.

Here, image data on RGB, which are obtained by the color scanner 10 (cf. FIG. 1), are converted into image data on the common color space (here L*a*b* color space) by the input profile explained referring to FIG. 4, and on the L*a*b* color space, first, there is performed a "range control" wherein a range of brightness is controlled for each input image. For example, in consideration of a case where image data are obtained by a digital still camera (DSC), when an image is too much dark in its entirety owing to the exposure under, or when an image is too much bright in its entirety owing to the exposure over, the range control performs a process of converting those inadequate images to an image of brightness corresponding to the adequate exposure.

On the common color space (L*a*b* color space), next, a color conversion table is referred to so that a color conversion is performed. This color conversion is performed on the common color space (L*a*b* color space) Accordingly, this color conversion is able to be performed independently of a sort of an input device and a sort of an output device. Here, as details will be described later, with respect to at least partial area on the common color space (L*a*b* color space), there is performed a color conversion considering that brightness is important even if change of hue is involved. The image data generated by this color conversion are converted into image data on CMYK by the output profile explained referring to FIG. 5. The image data on CMYK are further converted into dot data and transferred to the printing system 30 shown in FIG. 1. Thus, it is possible for the printing system 30 to obtain the printed image 31 which is more bright and improved in color quality as compared with a case where a color reproduction is faithfully performed as much as possible, explained referring to FIG. 6, even if the tone of color is somewhat different from the original image 11.

Here, in the input profile, a conversion from a color space (the RGB color space in case of the above-mentioned example) of the input device to a common color space (L*a*b* color space) is performed. And in the output profile, a conversion from a common color space (L*a*b* color space) to a color space (the CMYK color space in case of the above-mentioned example) of the output device is performed. The input profile and the output profile include processes (gamut mappings) for correcting a color reproducing area difference between the output device color space and the common color space, and a color reproducing area difference between the common color space and the output device color space, respectively. it is preferable that the input profile and the output profile perform such a color conversion that in the necessary color area the associated color appearance is preserved, as well as the correction of the color reproducing area difference.

Next, there will be explained a producing method of a color conversion table in the common color space.

Here, first, there will be explained the common color space. With respect to the common color space, according to the above explanation, the L*a*b* color space is raised by way of example. However, there is no need that the common color space is the L*a*b* color space. Any one is acceptable, as the common color space, which is defined in such a manner that it is independent of the specified input device or the specified output device. Other than the L*a*b*, for example, it is acceptable that the common color space is XYZ color space, or alternatively a coordinate system in coordinate points on color spaces are clearly associated with the color spaces on a one-to-one basis. By way of example of such a coordinate system, there is a standard RGB signal defined as follows.

$$\begin{bmatrix} R_{sRGB} \\ G_{sRGB} \\ B_{sRGB} \end{bmatrix} = \begin{bmatrix} 3.2410 & -1.5374 & -0.4986 \\ -0.9692 & 1.8760 & 0.0416 \\ 0.0556 & -0.2040 & 1.0570 \end{bmatrix} \begin{bmatrix} X \\ Y \\ Z \end{bmatrix}$$

Here, for example, when one wherein $R_{SRGB}$ is expressed with 8 bits is denoted by $R_{8bit}$, the following formula are given.

$$R_{8bit} = 255 \times 12.92 \, R_{SRGB} \quad (0 < R_{SRGB} < 0.00304)$$

$$R_{8bit} = 255 \times 1.055 \, R_{SRGB}^{(1.0/2.4)} - 0.055 \quad (0.00304 \leq R_{SRGB} \leq 1)$$

Also regarding $G_{8bit}$, $B_{8bit}$ wherein $G_{SRGB}$, $B_{SRGB}$ are expressed with 8 bits, likely, they are able to be converted from $G_{SRGB}$, $B_{SRGB}$, respectively.

Alternatively, it is acceptable that a color space defined by cmy density of a reversal film is adopted as the common color space. This makes it possible to clearly define the color reproducing range in the common color space.

A color conversion table in the common color space is described in form of, for example, a three-dimensional Look Up Table (LUT). Color conversion characteristics by the color conversion table are determined in a manner set forth below. Incidentally, in the following explanation, as the common color space, L*a*b* color space is adopted. Even if another common color space other than the L*a*b* color space is adopted, the following explanation is applicable when the adopted common color space is replaced by the L*a*b* color space.

In areas of C, M, Y of the common color space, first, basic colors $(L_c, a_c, b_c)$, $(L_m, a_m, b_m)$ and $(L_y, a_y, b_y)$ are determined.

It is desired, as the basic colors, to adopt colors corresponding to color materials in which the main absorption exists in red, green and blue areas, respectively. As a result of the test while varying coordinates of the basic colors, the remarkable effect is confirmed in the following color range.

C basic color; $40 < L_c < 65$; $-25 < a_c < -55$; $-35 < b_c < -60$

M basic color; $30 < L_m < 60$; $40 < a_m < 90$; $-20 < b_m < 20$

Y basic color; $70 < L_y < 90$; $-20 < a_y < 20$; $50 < b_y < 130$ \quad (1)

That is, each of the basic colors of C, M, Y may be defined as a one point in the associated color area.

Here, the following correction is applied to colors $(L_i, a_i, b_i)$ of input.

$$L' = L_i + \Delta L$$

$$a' = a_i + \Delta a$$

$$b' = b_i + \Delta b \quad (2)$$

Here, $(\Delta L, \Delta a, \Delta b)$ denote color correction vector, and are determined in accordance with the following formulas.

$$\Delta L = g_c c_c \Delta L_c + g_m c_m \Delta L_m + g_y c_y \Delta L_y$$

$$\Delta a = g_c c_c \Delta b_c + g_m c_m \Delta a_m + g_y c_y \Delta a_y$$

$$\Delta b = g_c c_c \Delta b_c + g_m c_m \Delta b_m + g_y c_y \Delta b_y \quad (3)$$

In the above formulas, $(\Delta L_c, \Delta a_c, \Delta b_c)$, $(\Delta L_m, \Delta a_m, \Delta b_m)$ and $(\Delta L_y, \Delta a_y, \Delta b_y)$ denote color vectors (referred to as the basic color vectors) wherein a basic white, which is defined by the following, is selected as a starting point, and color coordinate points of C basic color, M basic color and Y basic color are selected as terminal points. The basic white $(L_w, a_w, b_w)$ is defined as follows.

$$80 < L_w \leq 100, \ |a_w| < 10, \ |b_w| < 10$$

Figure 8:
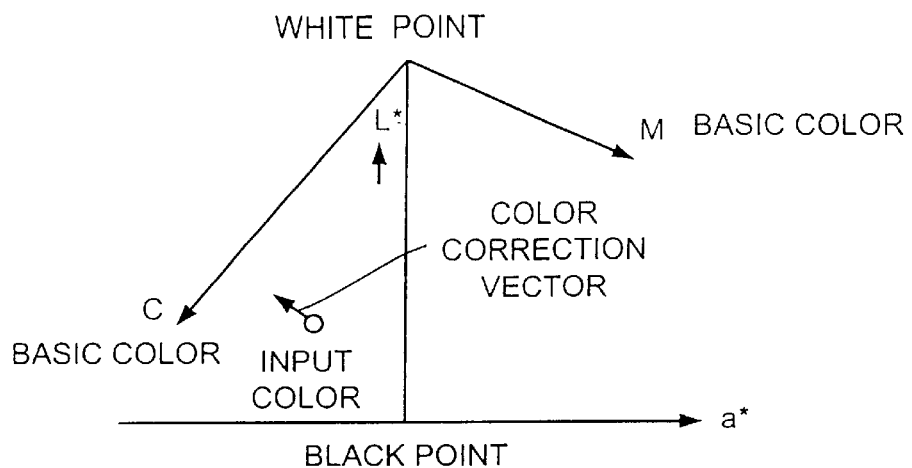
FIG. 8 is a view showing basic color vectors projected onto the L*a* plane in the L*a*b* color space.
Figure 9:
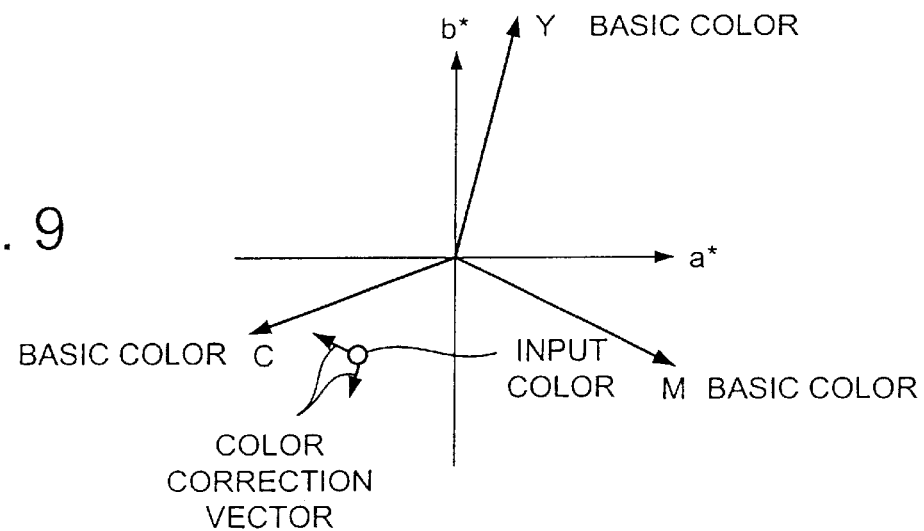
FIG. 9 is a view showing basic color vectors projected onto the a*b* plane in the L*a*b* color space.

FIG. 8 is a view showing basic color vectors projected onto the L*a* plane in the L*a*b* color space. FIG. 9 is a view showing basic color vectors projected onto the a*b* plane in the L*a*b* color space.

In the formula (3), $c_c$, $c_m$, $c_y$ denote correction factors with respect to the direction of C basic color vector, the direction of M basic color vector, and the direction of Y basic color vector, respectively, and are set up in accordance with hue of input colors as follows.

Where $H_i = \tan^{-1}(b_i/a_i)$ denotes a hue angle of input color $(L_i, a_i, b_i)$, and $H_c = \tan^{-1}(b_c/a_c)$, $H_m = \tan(b_m/a_m)$ and $H_y = \tan(b_y/a_y)$ denote hue angles of C basic color $(L_c, a_c, b_c)$, M basic color $(L_m, a_m, b_m)$, and Y basic color $(L_y, a_y, b_y)$, respectively, the following relations are established.

$$c_c < 0 \, (H > H_c + 90°, \text{ and } H < H_c - 90°)$$

$$c_c \geq 0 \, (H_c - 90° \leq H_i \leq H_c + 90°)$$

$$c_m < 0 \, (H > H_m + 90°, \text{ and } H < H_m - 90°)$$

$$c_m \geq 0 \, (H_m - 90° \leq H_i \leq H_m + 90°)$$

$$c_y < 0 \, (H > H_y + 90°, \text{ and } H < H_y - 90°)$$

$$c_y \geq 0 \, (H_y - 90° \leq H_i \, H_y + 90°)$$

Figure 10:
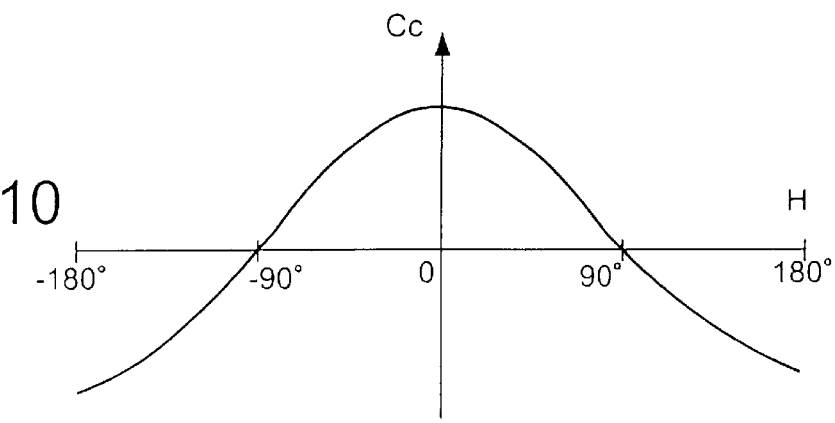
FIG. 10 is a conceptual view useful for understanding a correction factor.

FIG. 10 is a conceptual view useful for understanding a correction factor. FIG. 10 shows the correction factor $c_c$ on behalf of the correction factors $c_c$, $c_m$, $c_y$.

As seen from the above formulas and a solid line of FIG. 10, the correction factor $c_c$ is, in the area of $H > H_c + 90°$ and the area of $H < H_c - 90°$, a function of $c_c < 0$, and in the area of $H_c - 90° \leq H_i < H_c + 90°$, a function of $c_c > 0$. However, as shown with a broken line in FIG. 10, it is acceptable that the correction factor cc is, in the area of $H_c - 90° \leq H_i \leq H_c + 90°$, $c_c = 0$.

The phase angle $H_i$ of the input color, of which coordinates are shown in FIGS. 8 and 9, satisfies the following formula in relation with the phase angle $H_c$ of C basic color vector.

$$H_c - 90° \leq H_i \leq H_c + 90°$$

Here, in this area, there is adopted $c_c = 0$. Accordingly, the color correction in the direction of the C basic color vector is not performed. FIGS. 8 and 9 fail to show a color correction vector in the direction of the C basic color vector. This implies that the color correction of the input color in the direction of the C basic color vector is not performed (keeping standing still).

The phase angle $H_i$ of the input color, of which coordinates are shown in FIGS. 8 and 9, is out of the following formulas in relation with the phase angle $H_m$ of M basic color vector and the phase angle $H_y$ of Y basic color vector.

$$H_m - 90° \leq H_i \leq H_m + 90°$$

$$H_y - 90° \leq H_i \leq H_y + 90°$$

Accordingly, the correction factors $c_m$, $c_y$ regarding the direction of the M basic color vector and the direction of the Y basic color vector are given by $c_m < 0$, $c_y < 0$, respectively. Thus, coordinates of the input color move in directions opposite to the direction of the M basic color vector and the direction of the Y basic color vector, respectively.

Incidentally, while there is provided such an explanation that when it is concerned with $H_c-90°\leq H_i\leq H_c+90°$, $c_c=0$ is given, so that there is not performed a movement of input coordinates in the direction of the C basic color vector (keeping standing still in that direction), it is acceptable that in case of $H_c-90°\leq H_i\leq H_c+90°$, $c_c>0$ is given, the input coordinates are moved (corrected) actively in the same direction as the direction of the C basic color vector. This is the same as to $c_m$, $c_y$. According to many experimental results by the applicant of the present application, in the event that the input color is inside ±90° in phase angle with respect to the basic color, it is possible to obtain an effect expected in the present invention, even if the movement of coordinates of the input color is not always performed regarding the basic color. However, even in the event that the input color is inside ±90° in phase angle with respect to the basic color, it has been confirmed through many examples that movement of the input coordinates in the same direction as the direction of the basic color vector makes it possible to obtain more advantageous effect.

Here, for the purpose of easier understanding, gain factors $g_c$, $g_m$, $g_y$ included in the formula (3) are neglected. The gain factors $g_c$, $g_m$, $g_y$ shown in the formula (3) are expressed by $0 \leq g_c$, $g_m$, $g_y \leq 1$, for determining degrees of correction factors $c_c$, $c_m$, $c_y$ in magnitude, respectively, that is, degrees of correction in directions of basic color vectors of C, M, Y, respectively, and vary depending on the input color. It is preferable that the gain factors $g_c$, $g_m$, $g_y$ are defined, for example, as follows.

$$g_c = g_{co} r \cos \theta$$

$$g_m = g_{mo} r \cos \theta$$

$$g_y = g_{yo} r \cos \theta \quad (5)$$

Where r denotes an absolute value of an input color vector coupling the reference white point to the coordinate point of the input color. θ denotes the minimum angle of angles formed by the input color vector and CMY three basic vectors. $g_{co}$, $g_{mo}$, $g_{yo}$ denote constants for the associated basic colors. The minimum angle θ is common on the gain factors $g_c$, $g_m$, $g_y$ independently of the basic colors of C, M, Y. Accordingly, cos θ offers the larger value as it is closer to any of the basic color vectors (it implies that the gain is increased). And in the event that it is apart from any of the basic color vectors, for example, in the event that it is close to gray, cos θ offers the smaller value (it implies that the gain is decreased). As mentioned above, r is the absolute value of the input color vector coupling the reference white point to the coordinate point of the input color. It implies that as the absolute value is smaller, that is, as it is closer to white (thin in color), the gain is decreased, and as the absolute value of the input color vector is larger, that is, as it is thicker in color, the gain is increased.

Here, the association between density of the input color and coordinates of the output color is determined beforehand in accordance with the above-mentioned input color conversion algorithm, and a color conversion table is produced. In the actual color conversion, the color conversion table is referred to so that input color data constituting image data are converted into output color data.

Next, there will be explained a result of an actual color conversion using the color conversion table referenced above.

Here, the basic colors of CMY are expressed by C (54, −37, −49), M (44, 71, −8) and Y (85, −8, 88), and the reference white point is expressed by (92, −1, −2). As the input color, from a color image, sample points of red, yellow, purple and green are extracted and response of the color conversion table to the color was examined. L*a*b* values of the input color are shown in Table 1.

TABLE 1

|  | L* | a* | b* |
|---|---|---|---|
| Red | 35 | 38 | 20 |
| Yellow | 68 | 9 | 49 |
| Purple | 36 | 34 | −2 |
| Green | 35 | −18 | −2 |

Response of the color conversion table to the input color shown in Table 1, that is, an output color is set forth in Table 2.

TABLE 2

|  | L* | a* | b* |
|---|---|---|---|
| Red | 36 | 46 | 17 |
| Yellow | 70 | 10 | 60 |
| Purple | 37 | 41 | −15 |
| Green | 46 | −30 | 10 |

As seen from Tables 1 and 2, for example, with respect to red (the top stage of Tables 1 and 2), it moves in a direction opposite to the direction of C basic color vector (−36, −36, −47) and moves in a direction identical with the direction of M basic color vector (−48, 72, −6). Further, with respect to green (the bottom stage of Tables 1 and 2), it remarkably moves in a direction opposite to the direction of M basic color vector.

Image data, which were subjected to the color conversion processing by the color conversion table referenced above, and image data, which were not subjected to the color conversion processing by the color conversion table referenced above, were converted into dot data of CMYK and actually, an offset color printing was performed. In the even that the color conversion processing by the color conversion table referenced above is carried out, as seen from comparison of Table 1 with Table 2, while faithfulness of the hue is not maintained, there is presented a print which is excellent in brightness and less in color muddiness. Thus, it is possible to obtain the preferred color reproduction as the printed matter.

Further, there were examined dot data after the conversion as to both the image data passing through the color conversion table and the image data not passing through the color conversion table. A result of the examination is shown in Table 3.

TABLE 3

|  | C | M | Y | K | C' | M' | Y' | K' |
|---|---|---|---|---|---|---|---|---|
| Red | 45 | 95 | 100 | 0 | 37 | 96 | 81 | 0 |
| yellow | 13 | 31 | 80 | 0 | 8 | 29 | 89 | 0 |
| Purple | 50 | 88 | 52 | 0 | 44 | 89 | 20 | 0 |
| Green | 88 | 56 | 80 | 0 | 80 | 30 | 79 | 0 |

In Table 3, C, M, Y, K denote dot data involved in not passing through the color conversion table, and C', M', Y', K' denote dot data involved in passing through the color conversion table.

In Table 3, for example, with respect to red, C'=37 is provided for C=45, and with respect to green, M'=30 is provided for M=56. In this manner, the use of the above-mentioned color conversion table makes it possible to expect an effect of decreasing opposite color in an amount of ink dots, that is, a component involved in muddy color, and as a result, it is considered that the fine print as mentioned before can be obtained.

Further, the case of the use of the above-mentioned color conversion table and the case of no use of the color conversion table were implemented also for other printing processes (a chemical proof and a sublimation type of printer, an ink jet printer, an electrophotographic printer). As a result, in any of the printing processes, fine print less in muddiness can be obtained on the case of the use of the above-mentioned color conversion table.

Here, there will be described a comparison result of the color conversion process using the color conversion table produced by the above-mentioned algorithm with the conventional color conversion process.

Here, there are performed the color conversion process using the above-mentioned color conversion table and a saturation enhancing process for preserving hue to enhance saturation, which is the conventional process in the common color space, and those results are compared with one another. As a result that the saturation enhancing process was performed, red was converted into (35, 50, 37) Through the conversion, the hue was preserved and the saturation was increased. However, when printing was carried out in accordance with the same printing process as the above, unfortunately, a fine color could not be obtained on the print. Through confirmation of an amount of ink dots, it was understood that the amount became (4, 96, 92, 40) and K was entered too much. In order to improve this feature, there was performed a printing omitting a step of using K ink. As a result, however, while the saturation of red was improved, the hue was shifted, so that the tone reproduction and the color balance were greatly destroyed and thereby bringing about a print poor in quality.

Next, there will be explained an alternative producing method for the color conversion table shown in FIG. 7.

Figure 11:
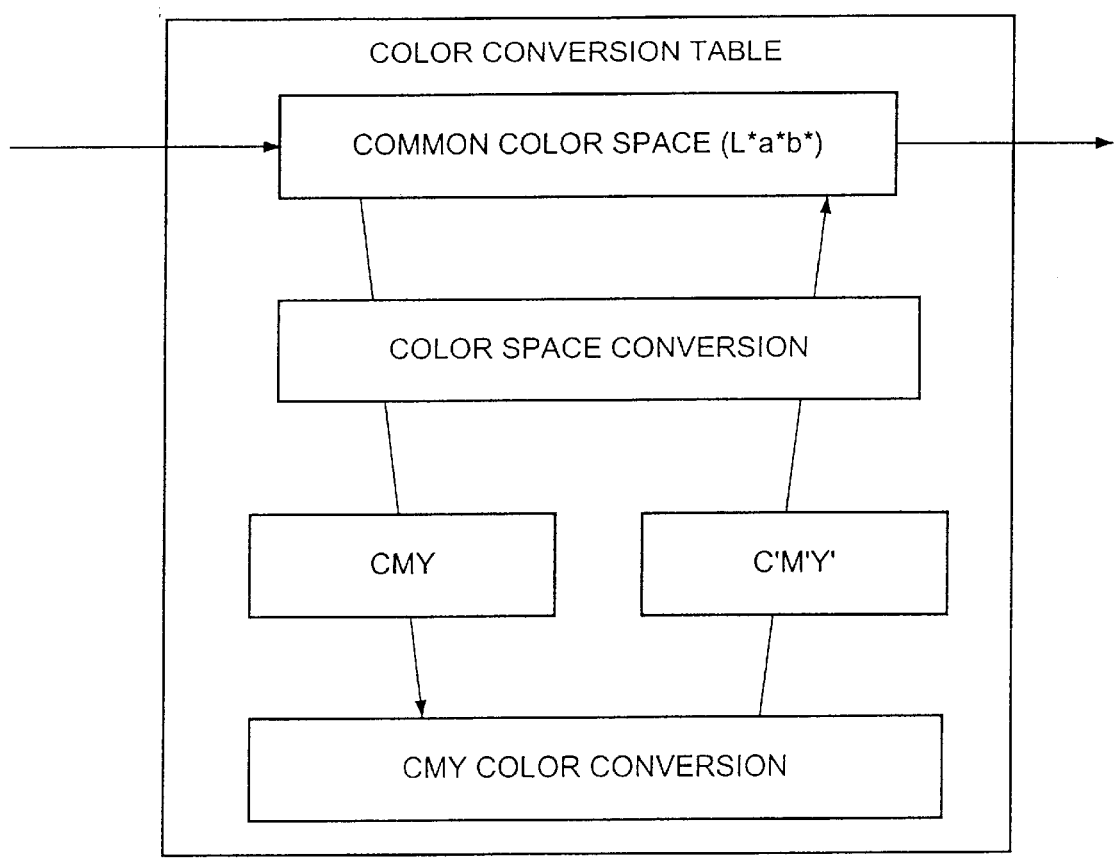
FIG. 11 is an explanatory view useful for understanding an alternative producing method for a color conversion table.

FIG. 11 is an explanatory view useful for understanding an alternative producing method for the color conversion table.

First, color data on the common color space, for example, L*a*b* color space, are converted into color data CMY represented by a ratio of the above-mentioned CMY three colors to the basic color.

From the CMY, color data C' M' Y' after conversion, which are in relation defined by the formulas set forth below, are obtained.

$$C = C' + m_r/m_g M' + y_r/y_b Y'$$
$$M = c_g/c_r C' + M' + y_g/y_b Y'$$
$$Y = c_b/c_r C' + m_b/m_g M' + Y' \qquad (6)$$

Where $c_r$, $c_g$, $c_b$, $m_r$, $m_g$, $m_b$, $y_r$, $y_g$, $y_b$ denote light absorption factor of red (R) area of cyan (C) color material, light absorption factor of green (G) area of cyan (C) color material, light absorption factor of blue (B) area of cyan (C) color material, light absorption factor of red (R) area of magenta (M) color material, light absorption factor of green (G) area of magenta (M) color material, light absorption factor of blue (B) area of magenta (M) color material, light absorption factor of red (R) area of yellow (Y) color material, light absorption factor of green (G) area of yellow (Y) color material, and light absorption factor of blue (B) area of yellow (Y) color material, respectively.

C' M' Y', which are obtained from the formula (6), are again converted into color data of the common color space, for example, L*a*b* color space.

Color data of the common color space (L*a*b* color space) before the above-mentioned process are associated with color data of the common color space (L*a*b* color space) after the above-mentioned process so that a color conversion table is produced.

The color conversion tables, which are produced in accordance with the above-mentioned algorithm, are the same as the color conversion tables, which are produced in accordance with the method explained referring to FIGS. 8 to 10, respectively.

Figure 12:
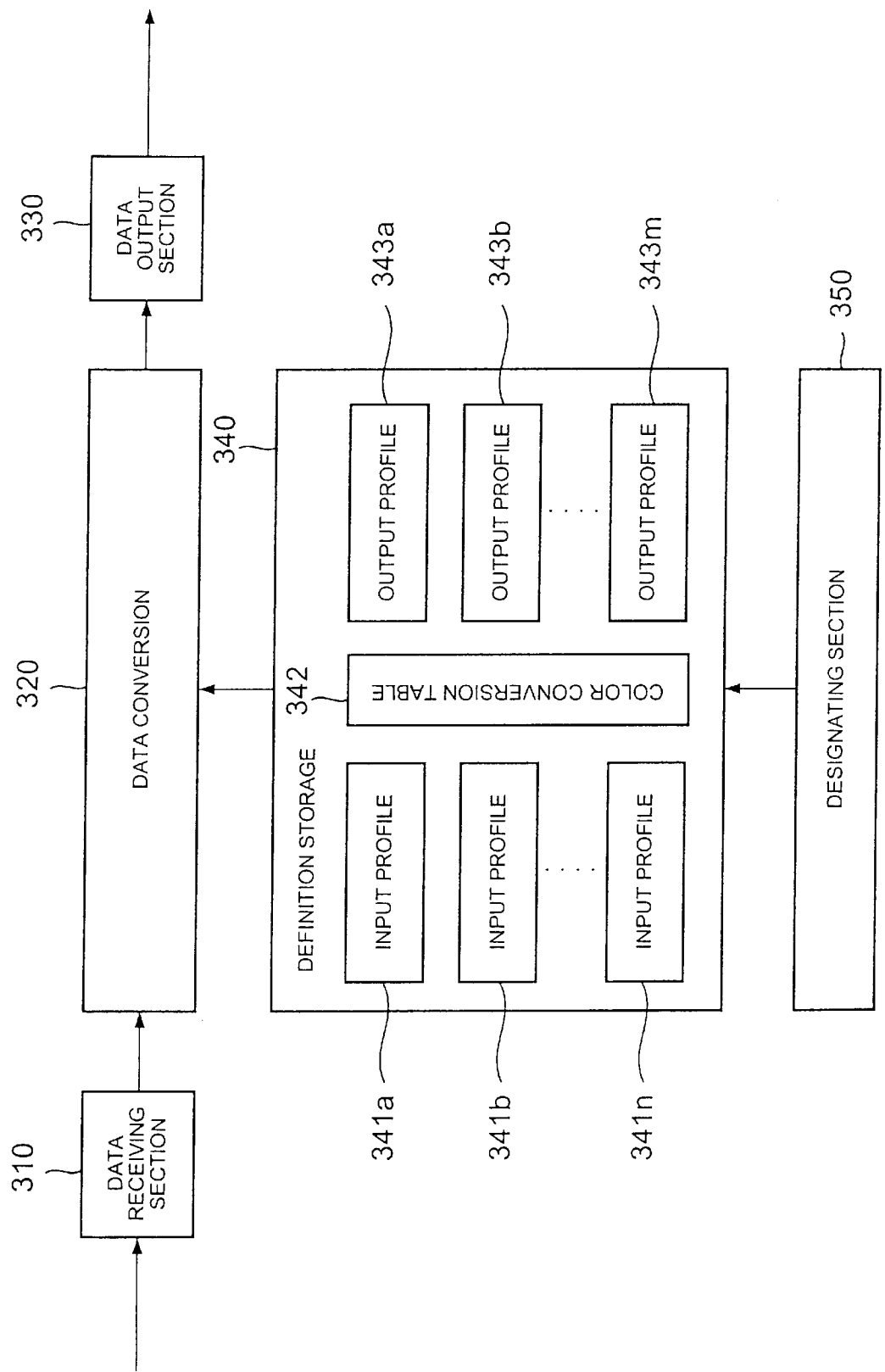
FIG. 12 is a functional block diagram of an embodiment of a color conversion apparatus according to the present invention.

FIG. 12 is a functional block diagram of an embodiment of a color conversion apparatus according to the present invention.

The color conversion apparatus shown in FIG. 12 is implemented by a combination of the personal computer 20 shown in FIGS. 2 and 3 and a program to be executed by the personal computer 20.

The color conversion apparatus shown in FIG. 12 comprises a data receiving section 310, a data conversion section 320, a data output section 330, a definition storage section 340 and a designating section 350.

The definition storage section 340 stores a plurality of sorts of input profiles 341a, 341b, . . . , 341n, which are associated with a plurality of sorts of input devices, respectively, a color conversion table 342, and a plurality of sorts of output profiles 343a, 343b, . . . , 343m, which are associated with a plurality of sorts of output devices, respectively.

The input profiles 341a, 341b, . . . , 341n are produced on various types of input devices in accordance with the producing method basically explained referring to FIG. 4. While FIG. 1 shows, as the input device, only one type of the color scanner 10, FIG. 12 shows the color conversion apparatus provided with a plurality of sorts of input profiles, which are associated with a plurality of sorts of input devices, respectively, for the purpose of providing generality.

The color conversion table 342 stored in the definition storage section 340 of the color conversion apparatus shown in FIG. 12 is the color conversion table for performing the color conversion peculiar to the present invention in the common color space (in the present embodiment L*a*b* color space) which is explained referring to FIG. 7. This color conversion table is produced in accordance with the producing method explained referring to for example FIGS. 8 to 10, or the producing method explained referring to FIG. 11.

The output profiles 343a, 343b, . . . , 343m, which are stored in the definition storage section 340, are produced on, various types of output devices in accordance with the producing method basically explained referring to FIG. 5.

In a similar fashion to that of the input profiles, while FIG. 1 shows, as the output device, only one type of the printing system 30, FIG. 12 shows the color conversion apparatus provided with a plurality of sorts of output profiles, which are associated with a plurality of sorts of output devices, respectively, for the purpose of providing generality.

The definition storage section 340 is set up inside the hard disk unit 213 shown in FIG. 3, and the definition storage section 340 (the hard disk unit shown in FIG. 3) corresponds to one embodiment of a color conversion definition storage medium of the present invention.

The designating section 350 performs designation of the input device and designation of the output device. On the hardware, the keyboard 23 shown in FIGS. 2 and 3 or the mouse 24 may serve as the designating section 350.

When the designating section 350 designates the input device and the output device, an input profile (input profile 341a) associated with the designated input device of a plurality of input profiles stored in the definition storage section 340 is read out and is fed to the data conversion section 320, and an output profile (output profile 343a) associated with the designated output device of a plurality of output profiles 343a, 343b, ..., 343m stored in the definition storage section 340 is read out and is fed to the data conversion section 320. Further, the color conversion table 342 is also read out from the definition storage section 340 and is fed to the data conversion section 320.

The data conversion section 320 produces, upon receipt of the input profile 341a, the color conversion table 342 and the output profile 343a, a LUT (look up table) for a single color conversion in their combination.

The data receiving section 310 serves to receive color data obtained by the input device. On the hardware, the input interface 216 shown in FIG. 3 corresponds to the data receiving section 310.

The data output section 330 serves to output color data after the color conversion by the data conversion section 320. On the hard ware, the output interface 217 shown in FIG. 3 corresponds to the data output section 330.

When color data, which are obtained by an input device, for example, the color scanner 10 shown in FIG. 1, are fed via the data receiving section 310 to the data conversion section 320, the data conversion section 320 performs a conversion of color data by the LUT for color conversion produced by the combination of the input profile 341a, the color conversion table 342 and the output profile 343a. The color data after the conversion are outputted via the data output section 330 to an output device, for example, the printing system 30 shown in FIG. 1.

The conversion of color data by the data conversion section 320 is a conversion referring to the color conversion table for performing the color conversion peculiar to the present invention, and thus hue is not always preserved, but it is possible to obtain an output image which is less in muddiness and high in color quality.

In the color conversion apparatus, it is preferable that there is provided such an arrangement that as one of the plurality of sorts of output profiles 343a, 343b, ..., 343m stored in the definition storage section 340, the output profile associated with the image display unit 22 shown in FIGS. 2 and 3 is prepared beforehand, the image based on the color data after the conversion by the data conversion section 320 is displayed on the display screen 22a of the image display unit 22 (cf. FIG. 2), and the designating section 350 (the keyboard 23 and the mouse 24) is provided with a function of correcting the color conversion table 342 so that the color conversion table 342 can be corrected in such a manner that the image becomes an image of a preferred color quality through an operator's observation of the image displayed on the display screen.

Figure 13:
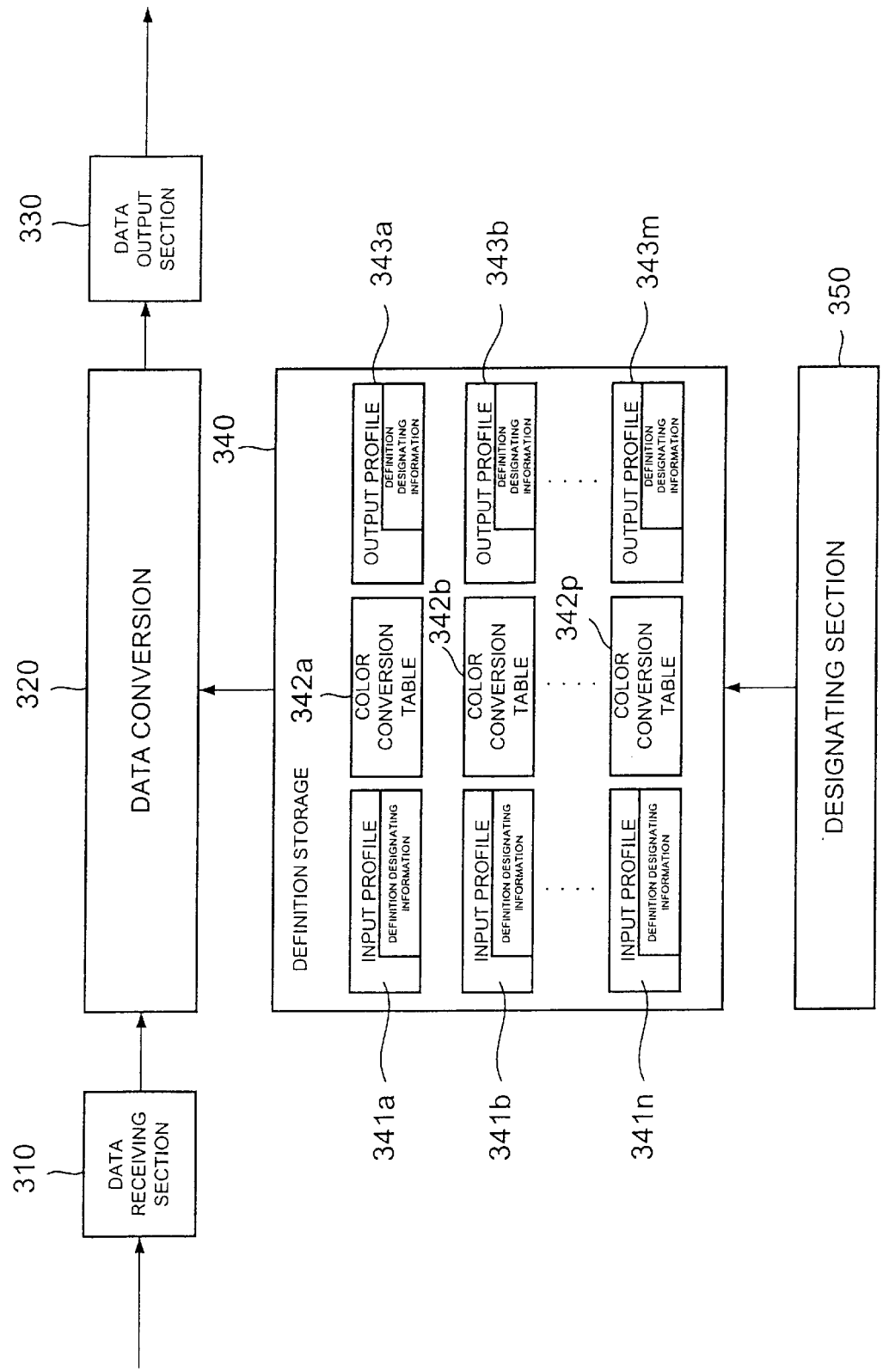
FIG. 13 is a functional block diagram of an alternative embodiment of a color conversion apparatus according to the present invention.

FIG. 13 is a functional block diagram of an alternative embodiment of a color conversion apparatus according to the present invention. In FIG. 13, the same parts are denoted by the same reference numbers as those of FIG. 12, and there will be described only the different points from the color conversion apparatus shown in FIG. 12.

The color conversion apparatus shown in FIG. 13 is implemented, in a similar fashion to that of the color conversion apparatus shown in FIG. 12, in accordance with a combination of the personal computer 20 shown in FIGS. 2 and 3 and a program to be executed by the personal computer 20.

A main difference of the color conversion apparatus shown in FIG. 13 from the color conversion apparatus shown in FIG. 12 resides in the storage contents of the definition storage section 340. The definition storage section 340 stores a plurality of sorts of input profiles 341a, 341b, ..., 341n, and a plurality of sorts of output profiles 343a, 343b, ..., 343m, which are similar to those stored in the definition storage section of the color conversion apparatus shown in FIG. 12, and in addition a plurality of sorts of color conversion tables 342a, 342b, ..., 342p which are different from the definition storage section of the color conversion apparatus shown in FIG. 12 in which only one sort of color conversion table is stored in the definition storage section. Each of the plurality of sorts of color conversion tables 342a, 342b, ..., 342p is a color conversion table for performing the color conversion peculiar to the peculiar to the present invention in the common color space (in the present embodiment L*a*b* color space) which is explained referring to FIG. 7. These color conversion tables 342a, 342b, ..., 342p are produced in accordance with the producing method explained referring to for example FIGS. 8 to 10, or the producing method explained referring to FIG. 11. In those color conversion tables, for example, correction factors $C_e$, $C_m$, $C_y$ of the formula (3) and constants $g_{co}$, $g_{mo}$, $g_{yo}$ of the formula (5) are mutually different.

The plurality of sorts of input profiles 341a, 341b, ..., 341n, and the plurality of sorts of output profiles 343a, 343b, ..., 343m, which are stored in the definition storage section 340 of the color conversion apparatus shown in FIG. 13, are applied with definition designation information. The definition designation information designates the color conversion table which is most suitable for the input profile or output profile from among the plurality of sorts of color conversion tables 342a, 342b, ..., 342p stored in the stored in the definition storage section 340.

When the input device and the output device are designated by the designating section 350, of the plurality of input profiles stored in the definition storage section 340, the input profile (for example, the input profile 341a) associated with the designated input device is read out and fed to the data conversion section 320, and of the plurality of output profiles stored in the definition storage section 340, the output profile (for example, the output profile 343a) associated with the designated output device is read out and fed to the data conversion section 320, and further a color conversion table (for example, the color conversion table 342a), which is designated by definition designation information appended to the input profile associated with the designated input device and definition designation information appended to the output profile associated with the designated output device is red out and fed to the data conversion section 320.

It is a principle that both the definition designation information appended to the input profile associated with the input device designated by the designating section 350 and definition designation information appended to the output profile associated with the output device designated by the designating section 350 are definition designation information for designating the same color conversion table. However, in the even that the color conversion tables designated by both the definition designation information are mutually different, according to the present embodiment, the definition designation information appended to the input profile takes procedure, and it is alarmed to an operator that the color conversion tables designated by both the definition designation information are mutually different.

The color conversion table thus designated by the definition designation information is one designated in form of a default, and if necessary, it is possible to do over again designating another color conversion table through an operation of the operator from the designating section 350.

In this manner, a permission of designation of the color conversion table as the default in designation of the input device and the output device may release an operator from doing over again designation of the color conversion table every designation of the device, and thus it is possible to provide an apparatus which is excellent in operability.

Incidentally, according to the embodiment shown in FIG. 13, while the definition designation information is appended to all the input profiles and the output profiles, it is acceptable that the definition designation information is appended to only the input profiles or only the output profiles, or alternatively it is acceptable that the definition designation information is appended to only part of the input profiles or only part of the output profiles, and only when input profile or output profile appended with the definition designation information is designated, the color conversion table is automatically designated in accordance with the appended definition designation information.

Figure 14:
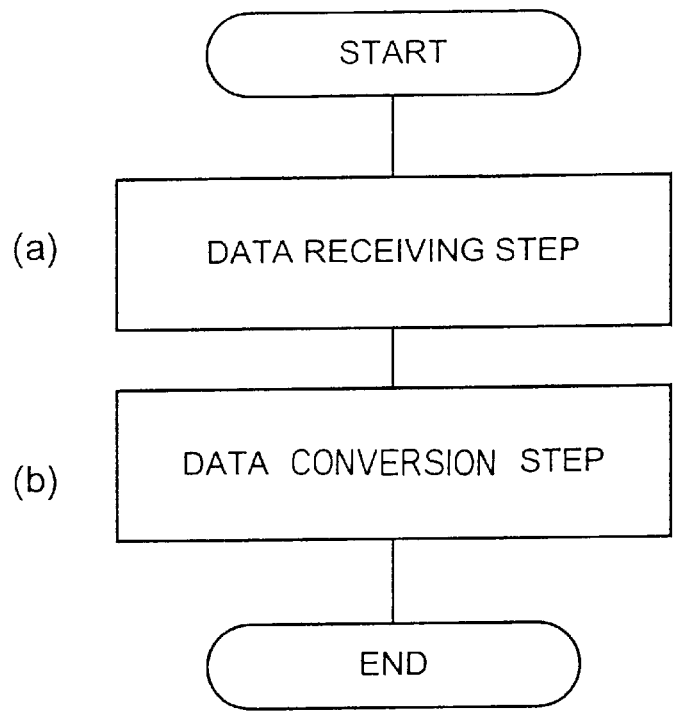
FIG. 14 is a flowchart useful for understanding an embodiment of a color conversion method according to the present invention.

FIG. 14 is a flowchart useful for understanding an embodiment of a color conversion method according to the present invention.

Here, first, in the data receiving step of a step (a), for example, the color scanner 10 shown in FIG. 1 is used to obtain input color data defined by coordinate values within the input device color space depending on the color scanner 10 (input device).

Next, in the data conversion step of a step (b), the data conversion peculiar to the present invention is performed.

Here, the input profiles, the color conversion tables and the output profiles, as mentioned above, are used to convert the input color data obtained in the data receiving step the step (a) into the output color data defined by coordinate values within the output device color space depending on the output device outputting an image. In this data conversion step, it is acceptable that the data conversion is performed sequentially effecting the input profiles, the color conversion tables and the output is profiles. However, it is preferable for a high speed data conversion processing that the input profiles, the color conversion tables and the output profiles are united to form a single color conversion definition, and the united single color conversion definition is used to perform the data conversion.

Here, the input profile adopted in the data conversion step of the step (b) is an example of the first color conversion definition referred to in the present invention, and defines the association between coordinate values within the input device color space depending on the input device (for example, the color scanner 10 of FIG. 1) used in obtaining the data receiving step of the step (a), and coordinate values of the common color space (L*a*b* color space in the present embodiment) which is independent of the input device and the output device. The color conversion table is an example of the second color conversion definition referred to in the present invention, and performs the color conversion peculiar to the present invention in the common color space (in the present embodiment L*a*b* color space) which is explained referring to FIG. 7. This color conversion table is produced in accordance with the producing method explained referring to for example FIGS. 8 to 10, or the producing method explained referring to FIG. 11. The output profile adopted in the data conversion step (b) is an example of the third color conversion definition referred to in the present invention, and defines the association between coordinate values within the common color space (L*a*b* color space in the present embodiment) and coordinate values within the output device color space depending on the output device from which an image is intended to be outputted.

Figure 15:
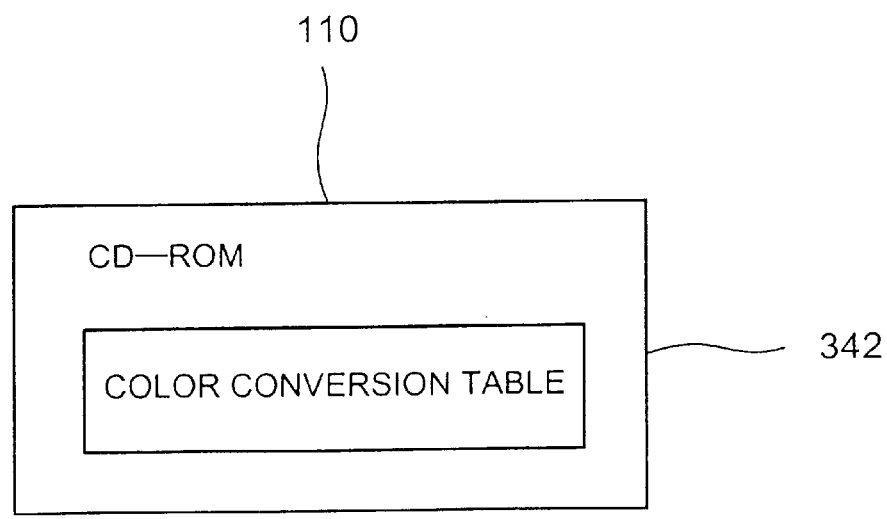
FIG. 15 is an illustration useful for understanding an embodiment of a color conversion definition storage medium according to the present invention.

FIG. 15 is an illustration useful for understanding an alternative embodiment of a color conversion definition storage medium according to the present invention. Referring to FIG. 12, as mentioned above, it is explained that the definition storage section 340 of the color conversion apparatus shown in FIG. 12 corresponds to one embodiment of the color conversion definition storage medium. FIG. 15 shows, as an alternative embodiment of a color conversion definition storage medium according to the present invention, an example in which a color conversion table 342 is stored in a CD-ROM 110.

As mentioned above, the color conversion table 340 is for performing the color conversion in the common color space, and it is possible to store only the color conversion table 342 for performing a preferred color conversion in a portable storage medium such as the CD-ROM 110, independently of the input profile and the output profile.

A user, who obtains such a color conversion table, up loads the obtained color conversion table onto one's color conversion apparatus having the function as shown in FIG. 12 for instance, and thus it is possible to perform a color conversion, which is high in color quality improved in brightness, using such a color conversion table.

As mentioned above, according to the present invention, it is possible to perform a color conversion for obtaining a color image, which is high in color quality, even in combination of various types of input and output devices.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A color conversion method comprising:
 a data receiving step of receiving input color data defined by coordinate values within an input device color space depending on an input device for receiving an image to derive image data; and
 a data conversion step of converting the input color data received in said data receiving step into output color data defined by coordinate values within an output device color space depending on an output device for outputting an image based on image data, using
 a first color conversion definition defining an association between coordinate values within the input device color space and coordinate values of a common color space independent of the input device and the output device,
 a second color conversion definition converting a set of values of input coordinate within partial space of at least part of the common color space into a set of values of output coordinate moved in an opposite direction to a direction of a vector wherein coordinate points of a reference white determined within a white area of the common color space are given as a starting point, and coordinate points of a basic color, in which the set of values of input coordinate exists outside ±90° in hue angle with respect to hue of a basic color, of basic colors determined in a cyan color area, a magenta color area and a yellow color area of the common color space, respectively, are given as a terminating point, and
 a third color conversion definition defining an association between coordinate values within the common color space and coordinate values of the output device color space.

2. A color conversion method according to claim 1, wherein in a case where the common color space is L*a*b* color space, or a case where the common color space is converted into L*a*b* color space, coordinate points $(L_c, a_c, b_c)$, $(L_m, a_m, b_m)$, $(L_y, a_y, b_y)$ of a cyan basic color determined in the cyan area, a magenta basic color determined in the magenta area and a yellow basic color determined in the yellow area, of said basic colors, satisfy $40<L_c<65, -25<a_c<-55, -35<b_c<-60$ $30<L_m<60, 40<a_m<90, -20<b_m<20$ $70<L_y<90, -20<a_y<20, 50<b_y<130$ and coordinate points $(L_w, a_w, b_w)$ of said reference white satisfy $80<L_w \leq 100, |a_w|<10, |b_w|<10$.

3. A color conversion method according to claim 1, wherein said second color conversion definition converts a set of values of input coordinate within partial space of at least part of the common color space into a set of values of output coordinate standing still in a direction of a vector wherein coordinate points of the reference white are given as a starting point, and coordinate points of a basic color, in which the set of values of input coordinate exists inside ±90° in hue angle with respect to hue of a basic color, of said basic colors, are given as a terminating point.

4. A color conversion method according to claim 1, wherein said second color conversion definition converts a set of values of input coordinate within partial space of at least part of the common color space into a set of values of output coordinate moved in a direction identical to a direction of a vector wherein coordinate points of the reference white are given as a starting point, and coordinate points of a basic color, in which the set of values of input coordinate exists inside ±90° in hue angle with respect to hue of a basic color, of said basic colors, are given as a terminating point.

5. A color conversion method according to claim 1, wherein said data conversion step produces a single color conversion definition in which the first color conversion definition, the second color conversion definition and the third color conversion definition are combined, and converts the input color data into the output color data in accordance with the single color conversion definition.

6. A color conversion apparatus comprising:

a data receiving section for receiving input color data defined by coordinate values within an input device color space depending on an input device for receiving an image to derive image data;

a data conversion section for converting the input color data received by said data receiving section into output color data defined by coordinate values within an output device color space depending on an output device for outputting an image based on image data; and a data output section for outputting output color data after conversion by said data conversion section, wherein said data conversion section converts the input color data into the output color data using a first color conversion definition defining an association between coordinate values within the input device color space and coordinate values of a common color space independent of the input device and the output device, a second color conversion definition converting a set of values of input coordinate within partial space of at least part of the common color space into a set of values of output coordinate moved in an opposite direction to a direction of a vector wherein coordinate points of a reference white determined within a white area of the common color space are given as a starting point, and coordinate points of a basic color, in which the set of values of input coordinate exists outside ±90° in hue angle with respect to hue of a basic color, of basic colors determined in a cyan color area, a magenta color area and a yellow color area of the common color space, respectively, are given as a terminating point, and a third color conversion definition defining an association between coordinate values within the common color space and coordinate values of the output device color space.

7. A color conversion apparatus according to claim 6, wherein in a case where the common color space is L*a*b* color space, or a case where the common color space is converted into L*a*b* color space, coordinate points $(L_c, a_c, b_c)$, $(L_m, a_m, b_m)$, $(L_y, a_y, b_y)$ of a cyan basic color determined in the cyan area, a magenta basic color determined in the magenta area and a yellow basic color determined in the yellow area, of said basic colors, satisfy $40<L_c<65, -25<a_c<-55, -35<b_c<-60$ $30<L_m<60, 40<a_m<90, -20<b_m<20$ $70<L_y<90, -20<a_y<20, 50<b_y<130$ and coordinate points $(L_w, a_w, b_w)$ of said reference white satisfy $80<L_w \leq 100, |a_w|<10, b_w|<10$.

8. A color conversion apparatus according to claim 6, wherein said second color conversion definition converts a set of values of input coordinate within partial space of at least part of the common color space into a set of values of output coordinate standing still in a direction of a vector wherein coordinate points of the reference white are given as a starting point, and coordinate points of a basic color, in which the set of values of input coordinate exists inside ±90° in hue angle with respect to hue of a basic color, of said basic colors, are given as a terminating point.

9. A color conversion apparatus according to claim 6, wherein said second color conversion definition converts a set of values of input coordinate within partial space of at least part of the common color space into a set of values of output coordinate moved in a direction identical to a direction of a vector wherein coordinate points of the reference white are given as a starting point, and coordinate points of a basic color, in which the set of values of input coordinate exists inside ±90° in hue angle with respect to hue of a basic color, of said basic colors, are given as a terminating point.

10. A color conversion apparatus according to claim 6, wherein said data conversion section produces a single color conversion definition in which the first color conversion definition, the second color conversion definition and the third color conversion definition are combined, and converts the input color data into the output color data in accordance with the single color conversion definition.

11. A color conversion apparatus according to claim 6, wherein said color conversion apparatus further comprises a definition storage section for storing:

one or more sorts of said first color conversion definition associated with one or more sorts of input device;

a plurality of sorts of said second color conversion definition;

one or more sorts of said third color conversion definition associated with one or more sorts of output device; and definition designation information designating one second color conversion definition from among the plurality of sorts of said second color conversion definition in association with said input device and/or said output device.

12. A color conversion apparatus according to claim 11, wherein said color conversion apparatus further comprises a designating section for designating input device and output device, and said data conversion section converts the input color data into the output color data using the first, second and third color conversion definitions selected in accordance with the input device and the output device designated by said designating section, and the definition designation information associated with the input device and/or the output device designated by said designating section, from among the first, second and third color conversion definitions stored in said definition storage section.

13. A color conversion definition storage medium for storing a color conversion definition for converting a set of values of input coordinate within partial space of at least part of a common color space independent of an input device for receiving an image to derive image data and an output device for outputting an image based on image data into a set of values of output coordinate moved in an opposite direction to a direction of a vector wherein coordinate points of a reference white determined within a white area of the common color space are given as a starting point, and coordinate points of a basic color, in which the set of values of input coordinate exists outside ±90° in hue angle with respect to hue of a basic color, of basic colors determined in a cyan color area, a magenta color area and a yellow color area of the common color space, respectively, are given as a terminating point.

14. A color conversion definition storage medium according to claim 13, wherein said color conversion definition storage medium stores in addition to said color conversion definition, a color conversion definition for converting coordinate values within an input device color space depending on an input device for receiving an image to derive image data into coordinate values within the common color space, and a color conversion definition for converting coordinate values within the common color space into coordinate values within an output device color space depending on an output device for outputting an image based on image data.

* * * * *